May 21, 1940.　　　　　A. H. TODD　　　　　2,201,803
LUBRICATOR
Filed Dec. 28, 1937
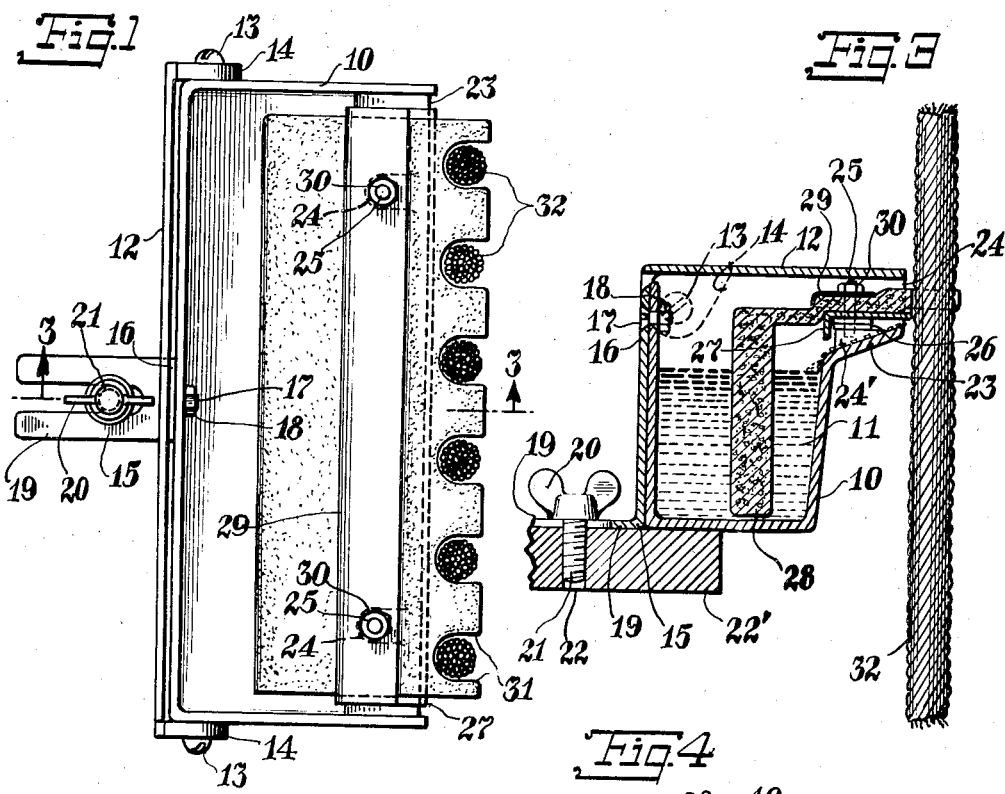
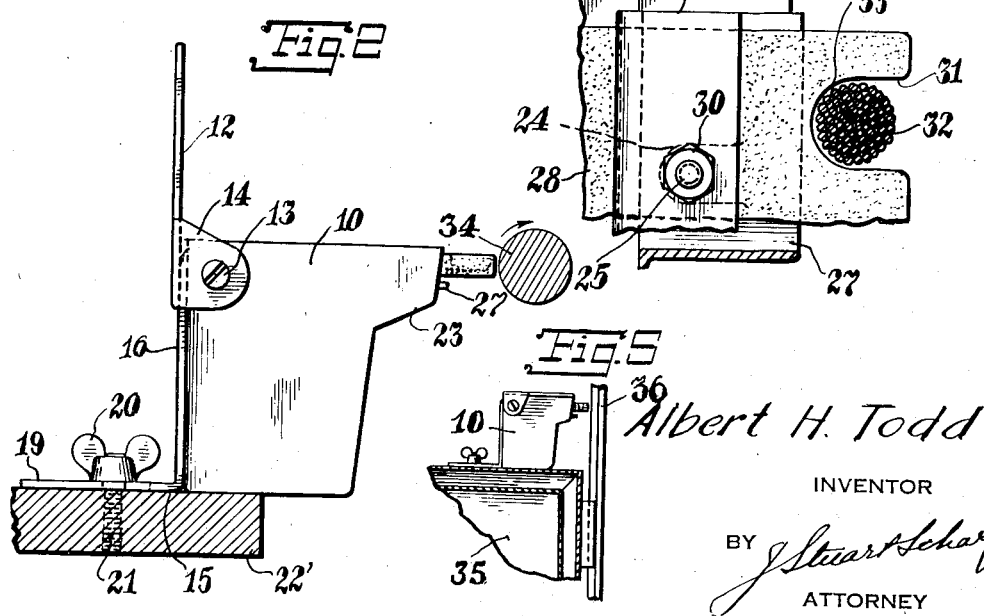
Albert H. Todd
INVENTOR
BY J. Stuart Scharf
ATTORNEY Patented May 21, 1940

2,201,803

UNITED STATES PATENT OFFICE 2,201,803

LUBRICATOR

Albert H. Todd, Bayside, Long Island, N. Y.

Application December 28, 1937, Serial No. 182,051

4 Claims. (Cl. 184—15)

My invention relates to the lubrication of cables, ropes, rails, shafts or other objects moving in relation to a stationary part, and particularly, my invention pertains to an apparatus, portable or built-in as a part of the unit, suitable for the lubrication of stationary or moving members.

The object of this invention is to provide a device which eliminates the necessity of lubricating objects by hand or spraying, with its resultant dangers and in a manner effectually reducing waste of lubricant.

A further object of this invention is to provide a lubricating device in which the quantity or amount of oil supplied may be easily adjusted and provide means to catch any oversupply or oil leakage.

A further object of this invention is to provide a lubricating device in which the upper end of the oil well is open and the entire device is movable in the direction towards the object to be lubricated.

The principal object of this invention is to provide a lubricator with a felt wick or other instrumentality in close relation to a stranded cable, where use is made of the suction or "air train" produced by the corrugated or stranded surface of the cable passing rapidly adjacent the wick, these corrugations or strands forcing the air on one side of the strand and causing a vacuum on the other side of the strand, the effect being to draw a sufficient amount of lubricant through the air gap and depositing it upon the surfaces to be lubricated.

Verification of the air suction theory has been made with the use of an Ellison portable inclined gauge, in measuring the air suction on elevator cables.

In practice it has been found that the lubricator increases its lubrication power if the lubricator is grounded. This is true particularly on slow speed jobs.

Verification of the electropotential generators and discharge and the transfer of mineral atoms can be found in "An Introductory Course in College Physics" by Prof. Newton H. Black (The Macmillan Co.) sections No. 329, 330, 331, 332, 334, 335, (Zeleny Electroscope) 338, 339 (Prof. R. A. Millikan's apparatus to measure electronic charge by means of the ionizing of oil), 346 (The Electrophorus) 348 (Belt conveyance of electricity) 413 (Electroplating of minerals) 540 (Ionization of gases and minerals).

The felt wick is merely used as a means for bringing the lubricant in close proximity to the moving part. Other means may also be employed. I do not wish to be limited to the use of the wick as an integral part of the invention inasmuch as volatile gases may also be used as a medium of transfer.

With the objects of invention above enumerated in view, my invention consists in the improved lubricating device illustrated in the accompanying drawing and hereinafter described and claimed, and in such variations and modifications thereof as will be obvious to those skilled in the art to which my invention relates.

In the drawing accompanying and forming a part of this application, similar characters of reference indicate corresponding parts in all views.

Fig. 1 is a plan view of lubricator as applied to cables with the cover open.

Fig. 2 is a side view of the lubricator as applied to shafts.

Fig. 3 is a section view on 3—3 of Fig. 1 with the cover closed.

Fig. 4 is an enlarged fragmentary view showing the adjusting means.

Fig. 5 is a fragmentary view showing the device attached to a cage and lubricating a guide rail.

Referring to the drawing, the reference numeral 10, denotes a container or tank made of any suitable material, preferably aluminum, within said tank 10, there is placed a quantity of lubricant 11, a closable cover 12, is adapted to rotate on the pins 13, by means of ears 14.

A bracket 15, having its vertical end 16, connected to the container 10, by means of a screw 17, and nut 18, while its horizontal member 19 is slotted and extends perpendicularly away from the container 10. Within the slot there is provided a wing nut 20, with an attached screw 21, which is in threaded relation with a tapped opening 22, in the metal or other stationary object 22', suitably grounded.

The purpose of the slotted bracket 19, and the wing nut 20, is to enable the entire container 10, to be moved and kept at any desired spot by means of the nut 20.

The container 10, has the front end formed with an inclined member 23, creating thereby an elongated opening 24. On said inclined member 23, there are spaced lugs 24', with integral upstanding screws 25. Washers 26, are set on the lugs 24', and a supporting plate 27, set on said washers 25. The purpose of said washers 25, is to keep the end of the supporting plate 27, spaced apart from the end of the inclined member 23.

The supporting plate 27, projects somewhat beyond the end of the inclined member 23.

A flat wick 28, is disposed within the lubricant 11, and is arranged to extend outwardly over the inclined member 23, and is arranged to rest on the supporting plate 27, and is held tight to said supporting plate 27, by means of an adjusting plate 29. The supporting plate 27, the wick 28, and the adjusting plate 29, are perforated to allow the screws 25, to pass through. A nut 30, is arranged to thread on the screw 25, above the adjusting plate 29, and thereby enable the wick 28, to be tightened as desired.

The wick 28, projects beyond the end of the supporting plate 27, and has cut out several U shaped openings 31. Each U shaped opening is adapted to encircle a cable 32, leaving a very small space 33, between the U shaped wick and the cable 32.

In Fig. 2 the lubricator 10, is shown as applied to a rotating shaft 34.

In Fig. 5 the lubricator 10, is attached to a movable cage 35, in an elevator shaft and is applied to lubricate the stationary guide rail 36.

Any lubricant suitable may be used. However, the use of colloidal graphite or other coating substance penetrating oil is prefered. This oil when transferred through the air by the movement of the parts tends to be evaporated from the surfaces after depositing the coating materials, but a sufficient quantity permeates to incase the metal bearing surfaces and reduce internal as well as external wear on the parts. This or any light penetrating oil carrying or not the colloidal graphite also increases sheave life in elevator cables without decreasing the necessary cable to sheave traction.

The use of colloidal graphite or other coating substance penetrating oil also prevents the rusting of the cable in the event that the lubricator container may run dry.

Any excess oil that may accumulate at the edge of the wick 28, tending to drip away, is caught beneath the plate 27, on the inclined projection 23, and thus runs back into the container 10, to be used over again.

In the operation of a portable lubricator (Fig. 3), the container is affixed to the flooring 22', or other stationary object and is adjusted by the wing nut 20, so as to bring the unperforated wick 28, near the set of cables, the wick is then forced against the cables so that the set of cables wear their own slots, the adjustment is continued so as to bring the U-shaped portion of the wick 28, to surround the cable 32 and as close thereto as possible without touching it.

The fast moving surface of the moving object such as cable, sets up a vacuum or an electrostatic attraction in the small space between the moving part and the wick, or other transfer medium whereby a transfer is produced and the lubricant held in proximity to the moving part will pass through the air and be deposited thereupon. By tightening on the nut 30 or otherwise constricting the flow of the lubricant, the amount passing to the part to be lubricated can be adjusted.

What I claim is:

1. In a lubrication system for rapidly moving stranded cables, a container for lubricant, a felt or other suitable conductor disposed within said lubricant and arranged to project substantially perpendicular and partly surrounding and in spaced relation yet within close proximity to said stranded cables.

2. In a lubrication system for rapidly moving stranded cables, a container for lubricant, a felt or other suitable conductor disposed within said lubricant and arranged to project substantially perpendicular and partly surrounding and in spaced relation yet within close proximity to said stranded cables, and means for controlling the amount of flow of lubricant through said conductor.

3. In a lubrication system for rapidly moving stranded cables, a container for lubricant, a felt or other suitable conductor disposed within said lubricant and arranged to project substantially perpendicular and partly surrounding and in spaced relation yet within close proximity to said stranded cables, said container being adjustably arranged so as to bring the lubricant within close proximity to the moving cable.

4. In a lubrication system for rapidly moving stranded cables, a container for lubricant, a felt or other suitable conductor disposed within said lubricant and arranged to project in spaced relation yet within close proximity and partly surrounding said stranded cables.

ALBERT H. TODD.